UNITED STATES PATENT OFFICE.

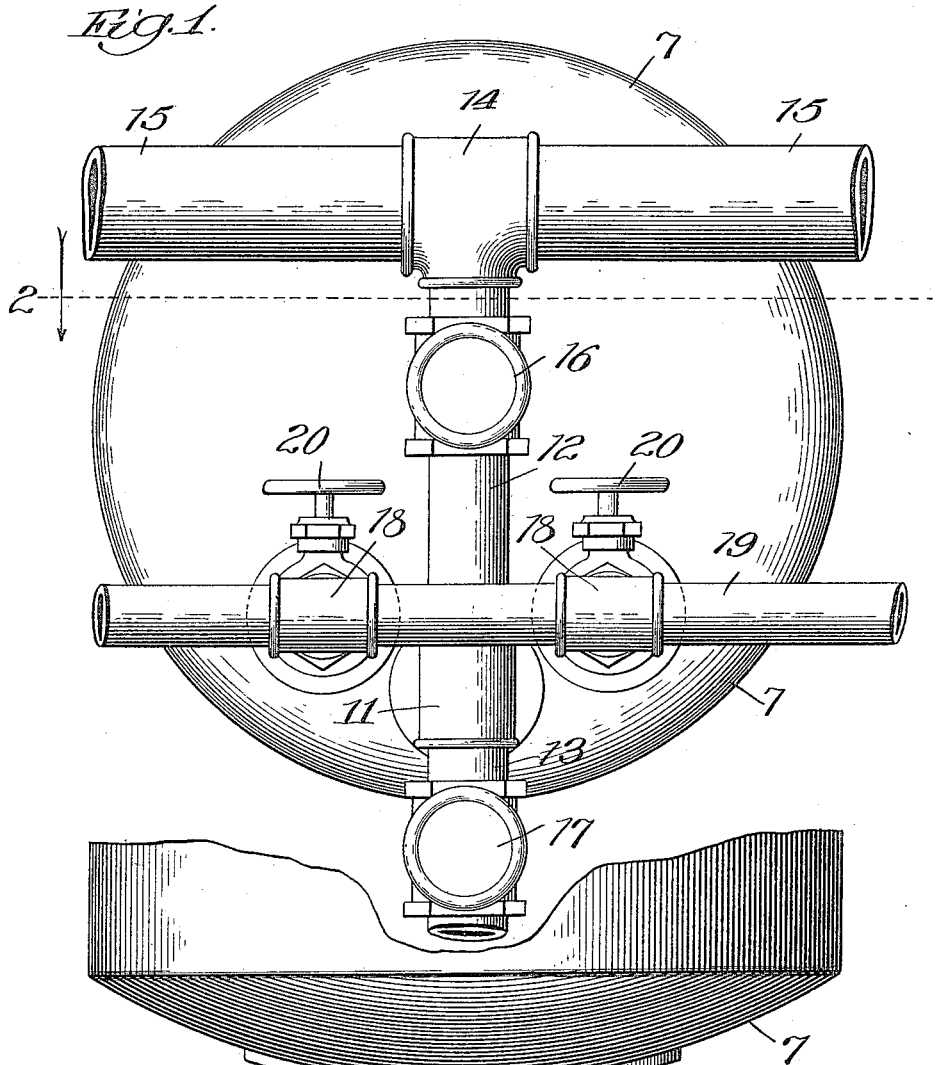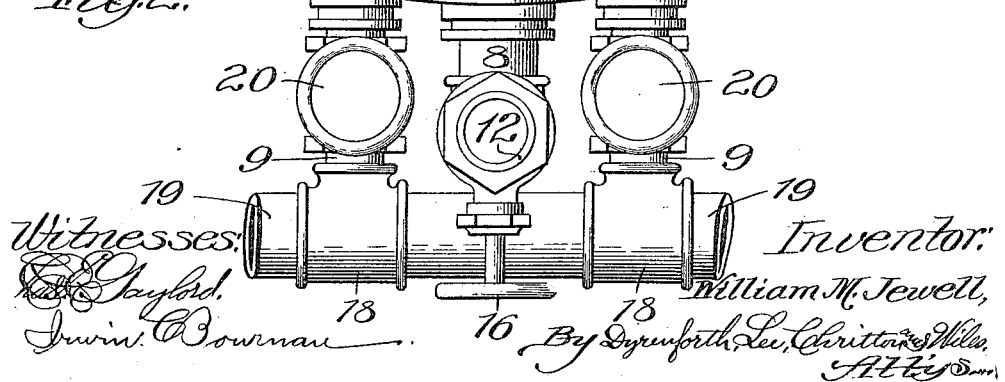

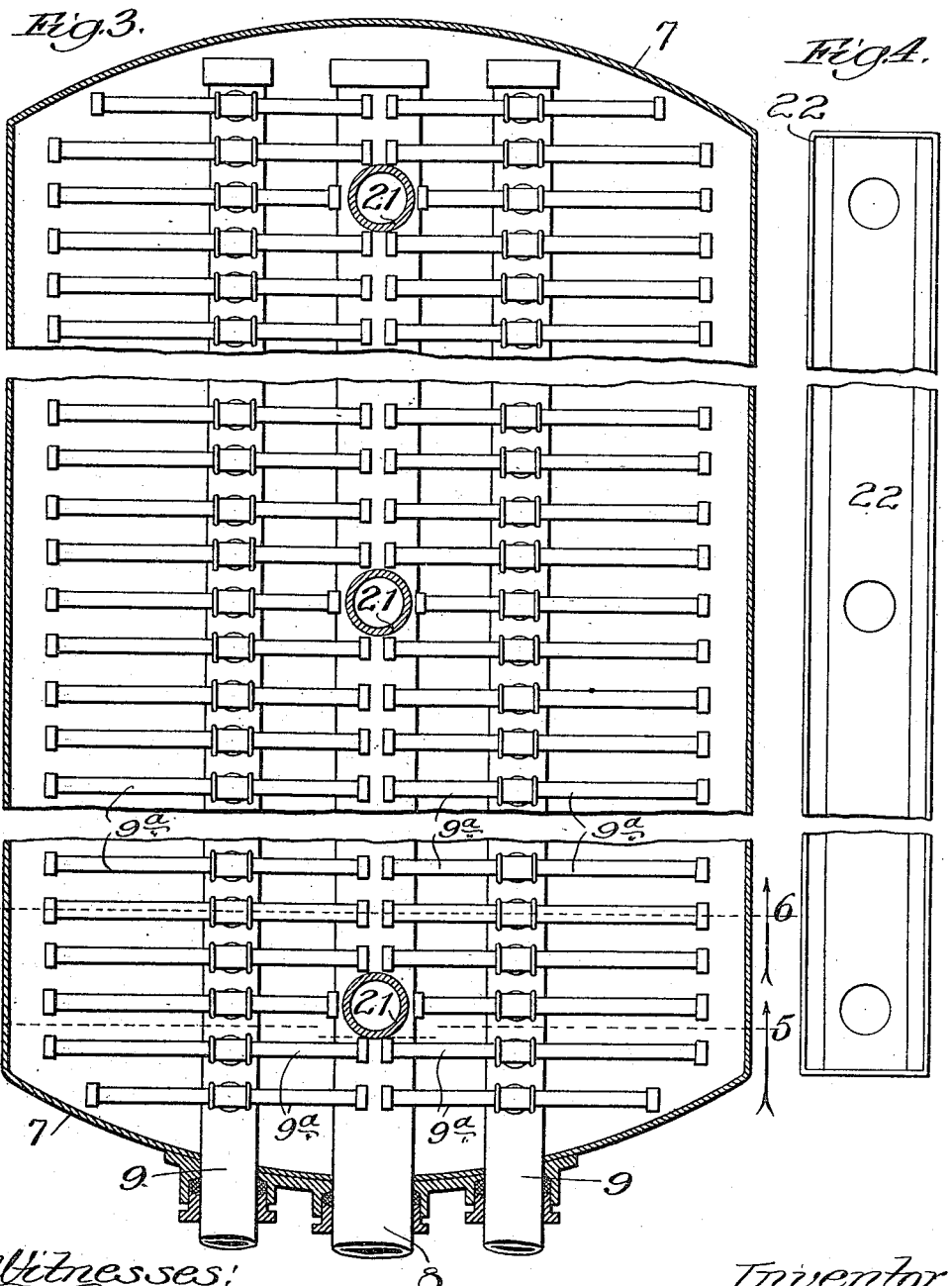

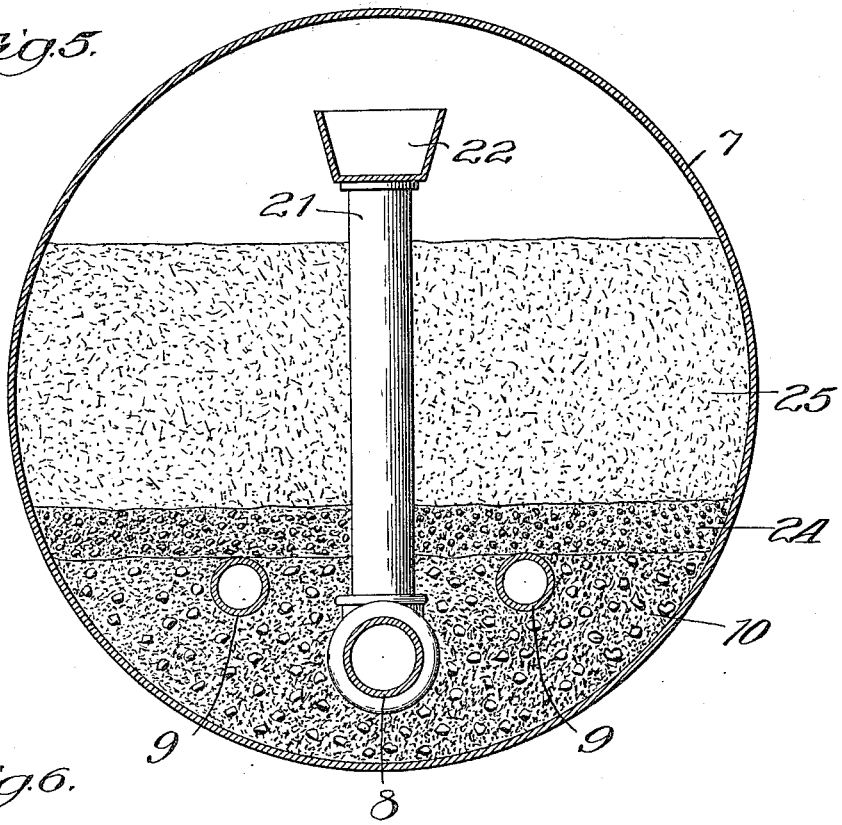
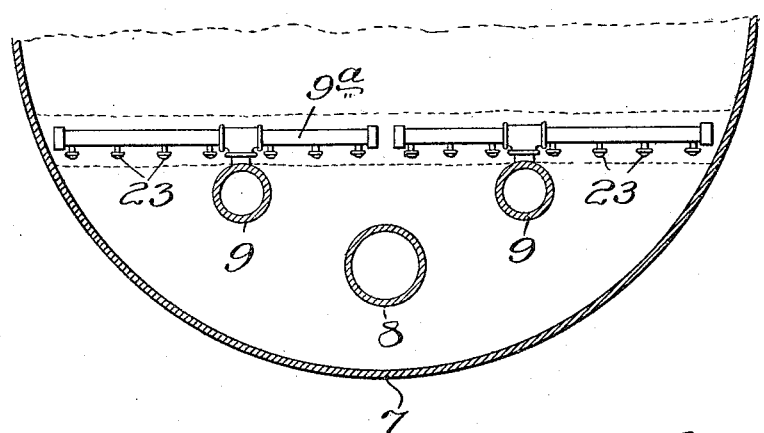

WILLIAM M. JEWELL, OF CHICAGO, ILLINOIS, ASSIGNOR TO JEWELL ENGINEERING COMPANY, OF CHICAGO, ILLINOIS, A CORPORATION OF ILLINOIS.

PRESSURE-FILTER.

1,214,167. Specification of Letters Patent. Patented Jan. 30, 1917.

Application filed June 15, 1914. Serial No. 845,192.

*To all whom it may concern:*

Be it known that I, WILLIAM M. JEWELL, a citizen of the United States, residing at Chicago, in the county of Cook and State of Illinois, have invented a new and useful Improvement in Pressure-Filters, of which the following is a specification.

My invention relates more particularly to filters wherein the water to be filtered is introduced into the filter under relatively high pressure and confined therein under pressure, as is usually the case in water-systems for supplying railroad watering stations, factories and many cities with water, the filter being interposed in the mains leading from the pumping station.

My object is to provide a novel, simple and economical construction of filter of this type which shall operate effectively to perform the filtering operation.

Referring to the accompanying drawings Figure 1 is a view in end elevation of a filter constructed in accordance with my invention showing the connections with the influent, effluent and waste-water pipes. Fig. 2 is a plan view of the end of the filter shown in Fig. 1 with one of the sections of the influent pipe shown in section taken at the line 2 on Fig. 1 and viewed in the direction of the arrow. Fig. 3 is a horizontal section taken through the filter just above the filtered-water collecting-pipes, with the embedding material for the influent and effluent pipes, and the filtered-bed omitted. Fig. 4 is a broken plan view of the trough which opens into risers communicating with the influent pipe. Fig. 5 is a section at the line 5 on Fig. 3 and viewed in the direction of the arrow, the pipe-embedding concrete and the filter-bed being shown in place in the filter and the riser through which this section is taken being shown in elevation; and Fig. 6, a section taken at the line 6 on Fig. 3 and viewed in the direction of the arrow, the pipe-embedding concrete and the superposed gravel layers being omitted.

The casing of the filter, as is usual in filters of this type, is usually of cylindrical form and is represented at 7, the casing containing an influent pipe 8 and effluent pipes 9 extending lengthwise of the casing 7 and preferably embedded in a mass of concrete 10, the pipe 8 opening into a coupling 11 connected at its opposite ends with pipes 12 and 13, the pipe 12 connecting at a coupling 14 with a pipe 15 through which the water to be filtered is supplied to the pipe 8, the pipe 15 being shown as it would preferably be provided where a battery of the filters are employed, namely, as a pipe which extends at both sides of the pipe 12 permitting a number of filters to be supplied from one supply pipe. The pipe 13, which serves to conduct the wash-water out of the filter during the washing operation, may lead into a sewer (not shown) or to any desired point of discharge, the pipes 12 and 13 being provided with valves 16 and 17 whereby, when the pipe 15 is feeding the filter with water to be filtered, the wash-water pipe 13 may be closed, and during the washing operation the pipe 12 may be closed. The pipes 9 connect at one end with couplings 18 opening at their opposite ends into a pipe 19 which, as in the case of the pipe 15, may be connected with a battery of filters to conduct the filtered water away from the filters through the pipe 19, the pipes 9 being provided with valves 20.

The pipe 8 is provided at intervals with risers 21 opening through the bottom of a trough 22 which extends in the upper part of the casing lengthwise of the latter either practically the entire length thereof as shown, or formed in sections corresponding to the number of risers and surmounting the latter. The pipes 9, through which the filtered water is conveyed out of the filter, are provided with inlets for receiving the filtered water, it being preferred that each of the pipes 9 be provided with substantially horizontally-extending branch-pipes 9ª extending at opposite sides of each pipe 9 and provided along their under sides with nipples, or strainers, 23 which communicate at their upper ends with the interiors of the pipes 9ª and at their lower ends open into the filter.

The filter bed is shown as superposed on the mass 10 of concrete, this bed, in accordance with common practice, being formed of a bottom layer 24 of relatively coarse graduated gravel and an upper layer of sand 25, the collecting nipples, or strainers, 23 being embedded in the coarser layer 24.

In the operation of the filter, the water to be filtered is introduced into the casing 7 upon the filter-bed by passing it from the pipe 15 through the pipe 8 (the valve 17 being closed), the water flowing upwardly through the pipes 21, and thence into the trough 22 from which it flows into the casing 7. The water upon filtering through the filter-bed is collected by the nipples, or strainers, 23, passing therethrough and through the branch-pipes 9ª into the pipes 9 from which it flows into the pipe 19 and is conducted away to a storage reservoir or to the filtered water-supply mains.

When it is desired that the filter be washed the operator closes the valve 16 and opens the valve 17. As the filter is of the pressure type, and discharges the filtered water under the action of the influent water under pressure, into pipes wherein pressure exists, the closing of valve 16 and opening of valve 17 causes the pressure to reverse in the filter, thereby producing a back flow of clear filtered water into the pipe 19, which passes into the pipes 9, out through the strainer-heads 23 and upwardly through the filter-bed, thus washing the latter, the water after passing through the filter, as stated, overflowing into the trough 22 and discharging through the pipes 21 and 8 to the wash-water outlet 13.

The feature of providing the downwardly extending strainer-heads in the pipe, which direct the wash-water into the gravel layer in a downwardly and lateral direction is of great advantage inasmuch as thereby a relatively great volume of water under relatively great pressure may be introduced into the filter-bed, even when the gravel layer is comparatively shallow, without danger of disturbing the gravel and misplacing the sand layer, and the gravel layer even to its lowermost portion may be thoroughly cleansed to render the filter sanitary.

While I have illustrated and described a particular construction embodying my invention, I do not wish to be understood as intending to limit it thereto, as the same may be variously modified and altered without departing from the spirit of my invention.

What I claim as new and desire to secure by Letters Patent is:

In a filter, the combination of a casing containing a filter-bed formed of gravel with superposed relatively fine filtering material, and a pipe embedded in said gravel and having downwardly extending strainer-heads located in the gravel of said bed, with downwardly and laterally extending openings, whereby water forced into said strainer-heads for washing the filter-bed, discharges therefrom downwardly and into the gravel, in jets, said pipe being closed to the interior of said casing excepting through said strainer-heads.

WILLIAM M. JEWELL.

In presence of—
L. HEISLAR,
F. A. FLORELL.

Copies of this patent may be obtained for five cents each, by addressing the "Commissioner of Patents. Washington, D. C."